Sept. 28, 1965  L. TIFFENBERG ETAL  3,208,339
COLOR CORRECTING MEANS FOR PROJECTORS AND THE LIKE
Filed Sept. 6, 1962  2 Sheets-Sheet 1
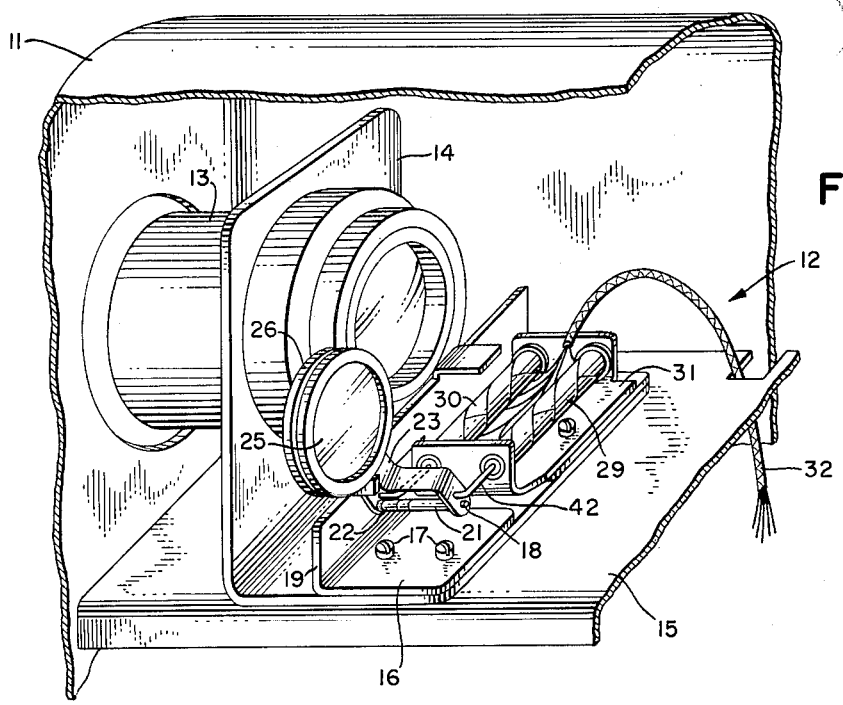
FIG. 1
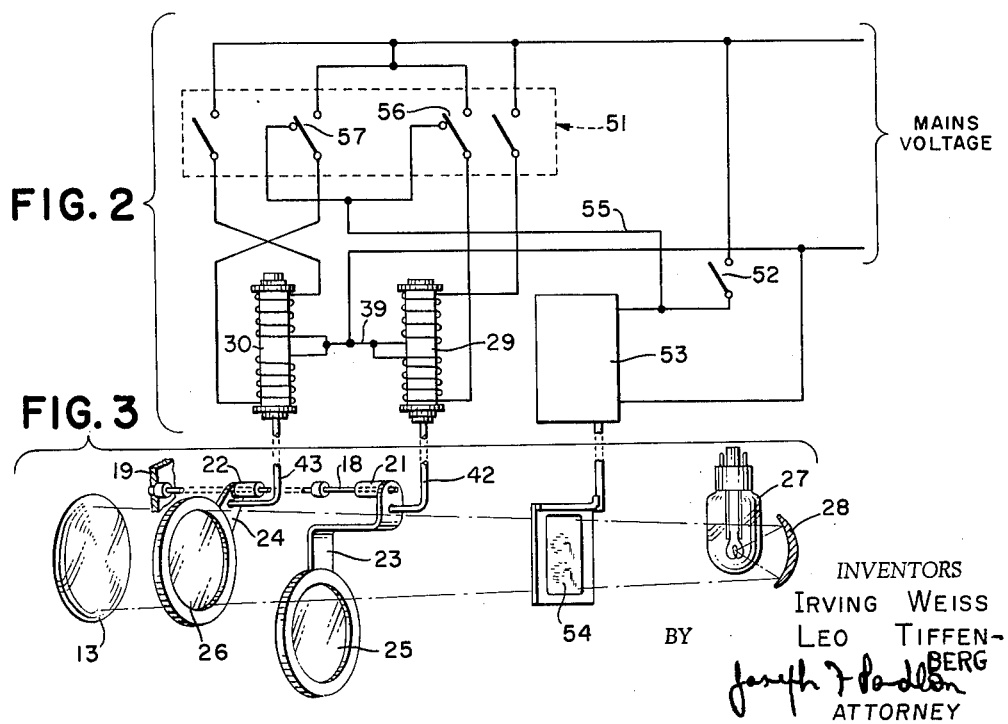
FIG. 2
FIG. 3
INVENTORS
IRVING WEISS
LEO TIFFENBERG
BY
ATTORNEY

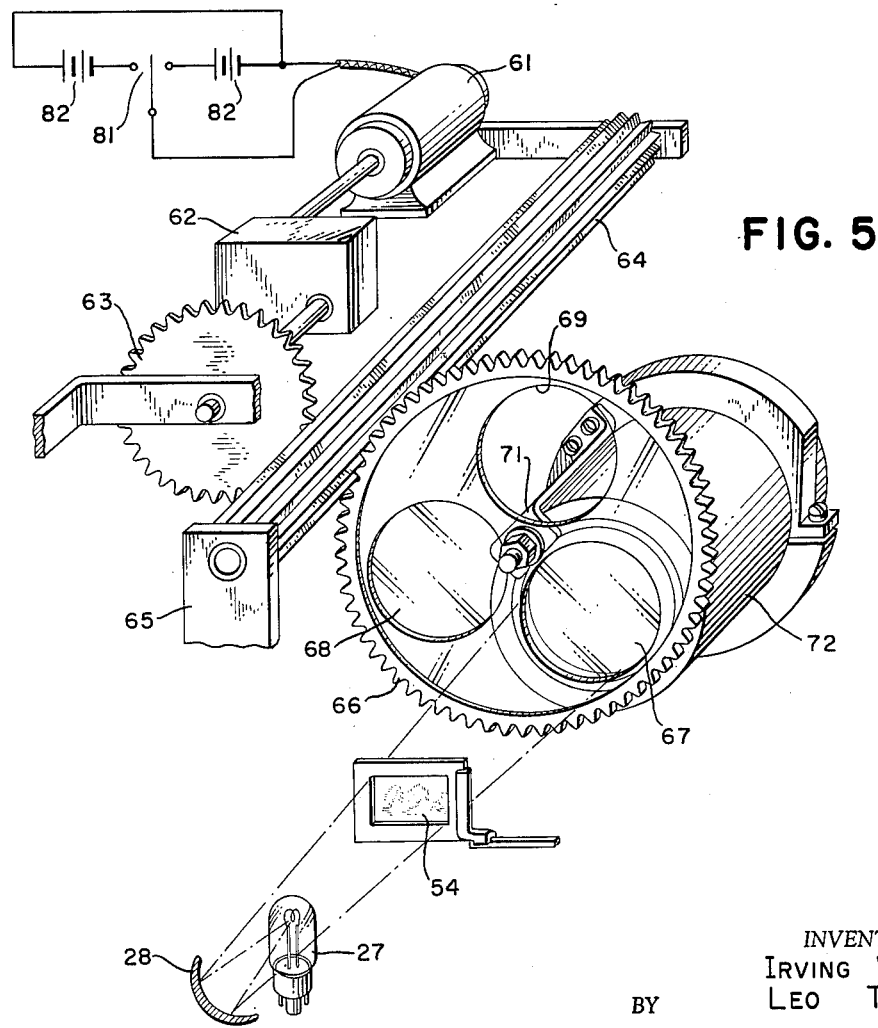

3,208,339
COLOR CORRECTING MEANS FOR PROJECTORS
AND THE LIKE
Leo Tiffenberg, Jericho, and Irving Weiss, Elmont, N.Y., assignors to Tiffen Manufacturing Corp., Roslyn Heights, Long Island, N.Y.
Filed Sept. 6, 1962, Ser. No. 221,707
1 Claim. (Cl. 88—24)

This invention relates to the projection of optical real images, and more particularly to the projection of such images as a rendition in colors.

Popularized primarily by the availability of color photographic films of remarkable quality and convenience, amateur projection of positive film transparencies made directly from color reversal negative film has achieved very wide acceptance. In this process the color balance, and hence the fidelity of color reproduction, depends rather critically on correct exposure of the negative.

Processing of such films in the usual sizes is nearly always done by sending them to a commercial processor, whose processing is accomplished entirely by machine. No provision is or can be made for the correction by special processing, of individual exposures which may be known or found to be inexact, in the familiar manner applicable to black-and-white photography, or even to color photography by the positive-negative processes.

As a result of this somewhat rigid exposure requirement, accompanied by the fact that commercial tolerances on the exposure accuracy of camera equipment, even when new, are quite lenient, it is usual for the photographer to receive from the processor together with those which are satisfactory, a number of color positives which are entirely clear and distinct as to the rendition of desired detail, but which are more or less heavily veiled in either a blue-green or an orange-red overall fog. In addition to this, such positives will project, as unusually deficient, in intensity of all colors complementary to such fog.

It has been known that this difficulty could be alleviated, and many of such positives salvaged by the employment of gelatin "warming" or "cooling" filters, of appropriate color, which, in the case of slides, for example, are bound into the individual slide in the density required for best correction. The process is a difficult and tedious one, however, and has never been very widely used.

A more satisfactory solution has been to provide a rotatable transparent color wheel of uniformly graduated chroma mounted for projection through a radius of the wheel. By this means, an appropriate compensating filter color can be found by rotating the wheel manually at the time of projection. It will be obvious, however, that this requires attendance at the projector throughout projection, and requires experiment at the time of projection of each transparency to determine the best filter rotation. Such process is merely distracting if quickly accomplished, but may become quite undesirable if undertaken by a meticulous or indecisive operator. It is to be noted, moreover, that when filters of this nature are to be used in proximity to a projection lens, as they must be in this and cases later to be mentioned, it is imperative that they be of excellent optical quality, that is to say, ground to substantial flatness, and also that if located within the projector, they must also be constructed of heat resisting materials. These requirements militate against the employment of such a uniformly graduated color wheel for reasons of cost, because of its large size.

A further and very common cause of color transparencies which exhibit incorrect color balance is the use of light having an incorrect color temperature for exposing the film. So important is this factor that such films commonly are provided in two separate varieties, indoor and outdoor, appropriate for use with incandescent tungsten and with sunlight illumination, respectively. Appropriate conversion filters are available for converting the characteristics of outdoor film into those of indoor film and vice versa when it is desired to change from one type of illumination to the other during the use of a single length of multi-exposure film. Since each film manufacturer, because of whatever special virtues his film may have, will prefer to recommend such color filters as most favorably affect his product, and these being generally different for the different available brands of film, it will be apparent that a considerable number of filters must be kept on hand at all times by the photographer who wishes to be able to achieve correct color balance on all exposures.

Especially is this so when his camera is provided with a turret containing a plurality of lenses of different focal length, in which case it is usual to provide triplicate filters for the lenses of a three lens turret, for example.

In a single, highly specific area of photography, namely photomicrography, one of the largest photographic film manufacturers has recommended that the following armamentarium of filters be employed in *taking* pictures with the several light sources and types of film described:

| Light Source | Correction filters for— | | |
| --- | --- | --- | --- |
| | Ektachrome B | Ektachrome F | Kodachrome Professional A |
| 6 v. ribbon or coil | 82 A | 82 A 82 C | 82 C |
| 300–750 W. coil | match! | 82 82 C | 82 A |
| Zirconium Arc | 2 B | 82, 82 C 28 | 82 A 2 B |
| Carbon Arc (4.5 Amp.) | 81 D 2 B | 82 2 B | 81 C 2 B |

In the much wider field of amateur photography, with its far more numerous available sources of light, kinds of film, and manufacturers of filters, it is obvious that a bewildering and quite impractically large variety of picture taking filters for color film is presented.

It is for this reason, that applicants prefer to make correction to the hue of the color transparencies, if needed only after they have been converted into projectable positives. It has been found that when this is done, satisfactory correction can be obtained in most needed cases, and substantial improvement in nearly all remaining needed cases, with the use of only two filters, one of bluish its far more numerous avialable sources of light, kinds of green and the other reddish yellow used alternatively (or not at all if unneeded) in the optical path of the projector.

We find that this can be accomplished in a most expeditious and convenient manner by utilizing a remote control mechanism for the operation of a filter control mechanism located on, or preferably in the color-positive viewing projector, such as a slide projector. Remote control is conveniently accomplished by means of electrical control button switches, which may be physically annexed to the similar remote control switches for slide changing and focusing which are to be found on many modern projectors. Alternatively, of course, other means of remote control such as wireless remote control by electromagnetic or ultrasonic waves, and pneumatic or hydraulic remote control may be employed if desired.

It is found further, that when the number of such color correction filters is reduced to the preferred number employed in the invention, the entire projection equipment, including the improperly exposed transparencies, constitutes a valuable lecture and demonstration visual aid device for teaching the nature and characteristics of color balancing to those interested in mastering the techniques of color photography. The simplification effected in explanation and demonstration, by the use of only two filters, produces a visual effect which is dramatic without any necessary diminution of instructional content.

It is therefore an object of this invention to provide in a color positive viewing projector, remotely actuatable color-balancing modification means for the correct projection of underexposed positives.

It is a further object of the invention to provide such a projector for the correct projection of overexposed positives.

It is still another object of the invention to provide such a projector for the improved projection of positives exposed with a light source of unmatched color temperature.

These and other objects will hereafter become apparent. We achieve by the instant invention, one specific illustrative example of the preferred embodiment whereof is shown in the attached drawings, wherein:

FIG. 1 is a perspective view of a portion of a projector containing the instant invention, FIG. 2 is an electrical wiring diagram, of the instant invention, FIG. 3 is an exploded view of a portion of the instant invention, FIG. 4 is a sectional view of a portion of FIG. 1 and FIG. 5 is a perspective view of another embodiment of the instant invention.

Turning now to the drawings wherein like numerals refer to like parts thruout, there is seen in FIG. 1 a portion of a housing 11 of a positive transparency projector 12 containing a projection lens 13 of the usual kind slidably retained in a bracket 14 which is secured to an interior deck 15 of the projector, all in the customary manner. Control equipment of any well known kind may be provided for moving lens 13 inwardly and outwardly in the bracket 14 upon remote command for focusing the projector at a remote location, but is not essential to the operation of the device and is not shown.

A chassis 16 is secured to the bracket 14 by means of screws, such as 17, and carries a stub shaft 18 secured for example, by riveting into a turned up portion 19 of chassis 16, as may be seen more clearly in the exploded view of FIG. 3. On the said shaft 18 are journalled the bushings 21 and 22 secured to the swingable filter carriers 23 and 24, respectively, which contain optical filters 25 and 26, respectively, retained therein.

Said filters are of the type used for the correction of the hue of color transparencies of films by reason of the fact that they have a bluish-green or a reddish-yellow cast to a significant, but not an extreme degree. The optical density of such filters is slight, and they cause no visually perceptible diminution in the brilliance of a projected image. Correspondingly, it is imperative that their depth of color be weak enough so that no color transparency requiring color correction by the filters will be so compensated to a point beyond the normal range of acceptable color balance. The chromatic intensity of these filters therefore are markedly different as indicated hereinabove from that of filters heretofore used for separation purposes, and for most camera lens filters used in the past for selecting the spectral response range of emulsions. In addition to this, of course, the particular color or hue of each of the instant filters is quite distinct from the relatively pure spectral colors employed in the earlier types of filters mentioned, as above disclosed.

Being located, as described, in proximity to the lens 13, and in its optical path, when so actuated, the filters 25 and 26 preferably have surfaces of smoothness and parallelism having an accuracy equivalent to that of a lens, i.e. they should be made of ground and polished glass in order to avoid introducing distortion or loss of definition in the projected image. Since they are located within the housing 11 wherein a lamp 27 and reflector 28, see FIG. 3, are contained, it is desirable also that they be constructed of a suitably heat resisting material, such as an appropriate glass.

Solenoids 29 and 30, mounted on bracket 31 have lead wires cabled at 32, and may be seen in greater detail in FIG. 4. A bobbin 33 contains a coil 34 at one end of solenoid 29, while a bobbin 35 contains a coil 36, at the other. Lead wires 37 and 38 respectively, taken in conjunction with common wire 39, actuate these coils alternatively. Armature 41 is thus positioned to the right or left, and thereby its attached connecting wire 42.

Wire 42 engages frame 23 and by its motion places filter 25 into or out of the optical path of the lens 13. By a similar arrangement, the solenoid 30 actuates the frame 24 of the filter 26 by means of the wire 43.

In FIG. 2, is seen the electrical wiring arrangement whereby operation of the filters is accomplished, and whereby retraction of both filters is caused to occur upon slide changing.

Mains voltage applied by closing any of the four separate poles of switch 51 to a connected coil of the solenoids 29 and 30 causes corresponding motion of the solenoid armature, and positioning of the respective filter. A switch 52 comprises a part of conventional slide changer 53 whereby slides such as 54 are automatically changed in sequence upon successive switch closures. Switch 52 is customarily remotely located on an extension cord, and it is contemplated that it will be integrated with the switch 51 of the instant invention to provide a compact unitary assembly having a single extension cord.

When closed switch 52 energizes wire 55 whereby through back contacts on switches 56 and 57, the coil 34 of solenoid 29, and the corresponding coil of solenoid 30 are energized to retract filters 25 and 26 from the optical path automatically.

There is seen in FIG. 5, a form of the invention wherein a motor 61 reversible by switch 81 in conjunction with batteries 82, drives reduction gear 62 to operate a gear 63 at relatively low speed in either direction. A pinion wire gear 64 journalled in fixed holders such as 65 engages a ring gear having optical filters 67 and 68 affixed in the web thereof, and an equal opening 69 symmetrically disposed thereto. Gear 66 is thus rotatable on a fixed bracket 71 under the influence of motor 61 to present filters 67 or 68 or clear opening 69 in the path of lens 72. It will be observed that because of the number and symmetry of the perforations shown in the gear 66 and the reversibility of motor 61, the gear 66 can always be rotated from an undesired setting to the desired setting directly, without passing over any intermediate undesired setting.

It will be noted that the invention herein described and illustrated may be readily applied and used in conjunction with color cameras, enlargers and TV projectors where color correction or emphasis is required.

Although this invention has been described in terms of a specific illustrative example thereof, it will be apparent to those skilled in the art that various modifications and elaborations may be made thereto which however, do not depart from the essential spirit of the invention, and it is therefore intended that the invention be limited only by the appended claim.

We claim:

Color transparency projecting means for reflective viewing wherein there is provision for remote control of picture changing by means of an assembly of electric push switches on a cable attached to a projector comprising a pivotally mounted first color filter having a hue bluer than a normally exposed transparency, a pivotally mounted second color filter having a hue redder than a normally exposed transparency, each of said filters having optically plane parallel and heat resistive surfaces, mounting means for each of said filters comprising frames hingedly swingable into and out of a line of transparency projection, actuatable motor means for said mounting means comprising a pair of solenoids, each having a plunger attached to said mounting means, each having a pair of windings disposed one at each end thereof and energizable for motion of said frame in each direction, remote control means for and connected to said solenoids comprising at least a pair of electric push switches attachable to the said push switches of said projector and a plurality of actuating conductors integral with said cable and connecting with said pair of electric push switches, and circuit means for energizing said motor means by said remote control means for energizing said solenoids to swing said mounting means into and away from the projective path of said projector upon picture changing said circuit means, including connections with a source of electrical energy for energizing said solenoids.

References Cited by the Examiner

UNITED STATES PATENTS

| | | |
|---|---|---|
| 2,243,048 | 3/41 | Foster. |
| 2,571,697 | 10/51 | Evans _____ 95—73 |
| 3,019,704 | 2/62 | Zillmer _____ 88—24 X |
| 3,107,578 | 10/63 | Engelage _____ 88—24 |

OTHER REFERENCES

Sharps, W. S.: Dictionary of Cinematography and Sound Recording, London, Fountain Press, 1959, page 17.

NORTON ANSHER, *Primary Examiner.*

WILLIAM MISIEK, *Examiner.*